Figure 1:
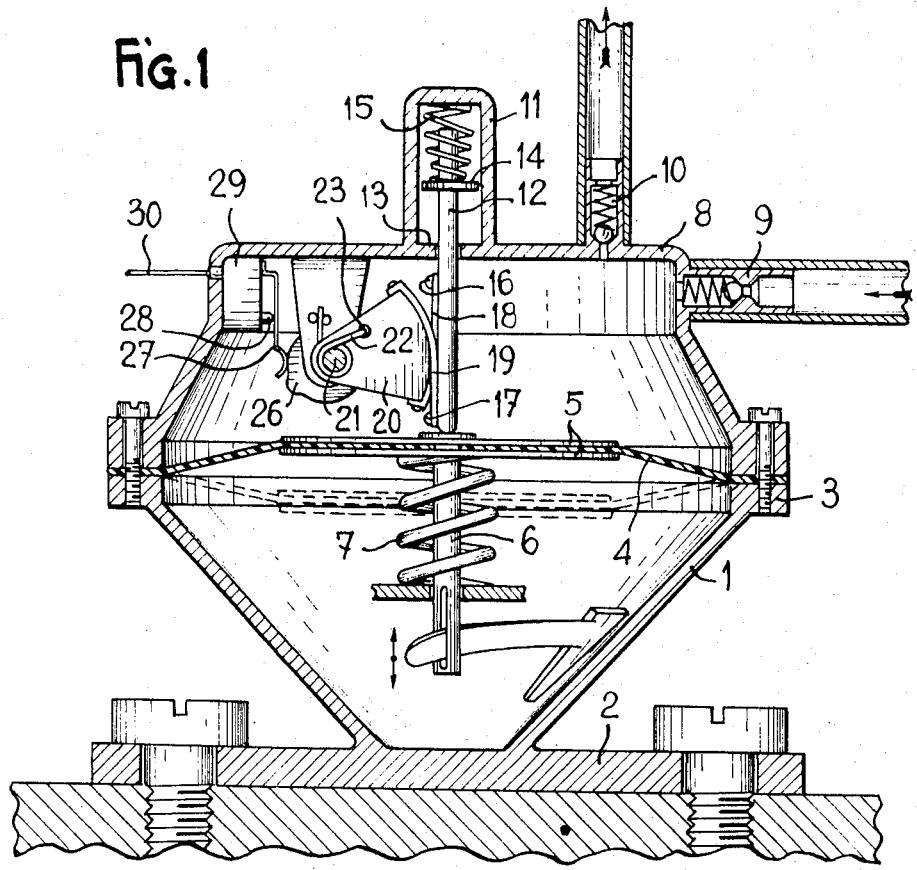

United States Patent [19]
Evrard

[11] 3,798,963
[45] Mar. 26, 1974

[54] DEVICE FOR MEASURING FLUID CONSUMPTION

[75] Inventor: Jean Claude Evrard, Perthes-en-Gatinais, France

[73] Assignee: George Rapee, New York, N.Y.

[22] Filed: Nov. 6, 1972

[21] Appl. No.: 304,273

[30] Foreign Application Priority Data
Mar. 3, 1972  France .............................. 72.07394

[52] U.S. Cl. ................................................ 73/113
[51] Int. Cl. .......................................... G01m 15/00
[58] Field of Search ........ 73/113, 239, 114; 74/138, 74/141, 163

[56] References Cited
UNITED STATES PATENTS
2,162,093  6/1939  Madden .......................... 73/113 X
3,029,632  4/1962  Nistri .................................... 73/113

*Primary Examiner*—Jerry W. Myracle
*Attorney, Agent, or Firm*—Darby & Darby

[57] ABSTRACT

A device for measuring the consumption of fluid in equipment including a pump, said device comprising a component connected, on the one hand, to a movable part of the pump and, on the other hand, to a rotatable shaft by means of an intermediary member which may be a motion converter. The rotatable shaft is under the influence of a member which locks it in one direction and is connected to a mechanism which includes a revolution counter and a mechanical motion converter which generates electrical pulses capable of being transmitted to a read-out and/or measuring device such as a calculator of average values as a function of time and/or distance. The device is of particular use in giving a reading of gasolene consumption in a motor vehicle, but is not limited to such use: indeed the fluid concerned need not be a liquid but may be a gas.

7 Claims, 7 Drawing Figures

DEVICE FOR MEASURING FLUID CONSUMPTION

The present invention relates generally to the field of fluid-flow meters, and more particularly to devices for measuring rate of flow of fuel per unit of time, or consumption whilst travelling a specified distance Most apparatus which operates by consuming a fluid fuel does not include a measuring instrument enabling the consumption at any given moment to be known.

Thus, in motor-vehicles, the only unit available is a gauge which indicates the amount of gasolene remaining in the vehicle tank without it being possible to know what the consumption is for a distance travelled, e.g. 100 kilometers.

It is an object of the invention to enable the consumption of fluid in a given time to be known, using equipment which includes a volumetric pump, by measuring and displaying this consumption on the basis of the number of normal operations of the pump.

Further objects and advantages will become apparent from a perusal of the specification which is as follows:

To this end, the invention consists in a device for measuring the consumption of a fluid comprising a pump having a moving part, a component connected, on the one hand, to said movable part of said pump and, on the other hand, to a shaft which is rotatable by means of an intermediate member, said rotatable shaft being under the influence of a member operable to lock it in one direction and being connected to a mechanism which includes a revolution counter and a mechanical motion converter operable to generate electrical pulses that are transmissible to a read-out device. Said read-out device may be a measuring device.

The movable part of said pump is preferably of the type having reciprocating linear motion, the component connected to this movable part comprising a rod pressed against said movable part by a spring and guided longitudinally, said rod receiving one end of at least one flexible and inextensible strip of which the other end is fixed to an arcuate portion of a sector which is mounted to pivot and is connected to the rotatable shaft by the uni-directional locking member.

In one particular embodiment, the sector is mounted to pivot on the rotatable shaft itself and receives one end of a spring which is coiled around the said shaft for a substantial proportion of its circumference and even, possibly, for several turns, while a second spring, symmetrical with the first, is coiled around the shaft in the opposite direction, its other end being connected to a fixed part of the device.

Said rod may receive one end of each of the two strips at two points separated from one another, these two strips being fixed to the sector by their other end, while being applied to a substantial proportion of the arcuate portion of the sector and being mutually intersecting.

In a modification, the rod receives one of the ends of only one strip which is fixed to the sector by its other end, it being applied to a substantial proportion of the arcuate portion of the sector, which sector is subject to a return spring operating in the opposite direction to that of the traction transmitted from the rod to the sector by the strip.

Advantageously, the strip, the sector and the rod are made all in one piece, of moulded synthetic material for example, it being possible to obtain the return-spring action from the elasticity of the material itself.

Preferably, the rod is hollow and is guided by a second fixed rod which is introduced into the first mentioned rod.

The rotatable shaft may be firmly attached to a cam located opposite a plunger of an electrical switch situated in a circuit connecting it to the read-out and/or measuring device.

According to another feature of the invention, the rotatable shaft is firmly attached to a disc whose periphery is equipped with fenestrations such as notches or apertures which are interposed between a light-source and a photo-sensitive cell situated in a circuit connecting it to the read-out and/or measuring device.

Conveniently, the device also includes a housing which can be substituted for the cover of an existing fuel pump and which includes, like such existing pump adaptor and fixing means as well as, possibly, inlet and an outlet means for the fluid to be measured, the various components making up the device being fitted inside the said housing, through which runs a passage which provides the electrical connection for the impulse generator to the read-out and/or measuring device which is itself situated outside the housing.

The pulse generator may be so positioned that it is always completely surrounded by the fluid and, when the fluid is a liquid, is at a lower level than the minimum level for said liquid may be.

Figure 2:
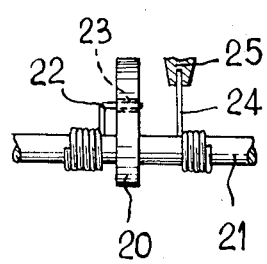
Figure 3:
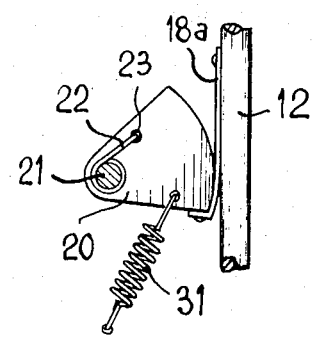
Figure 4:
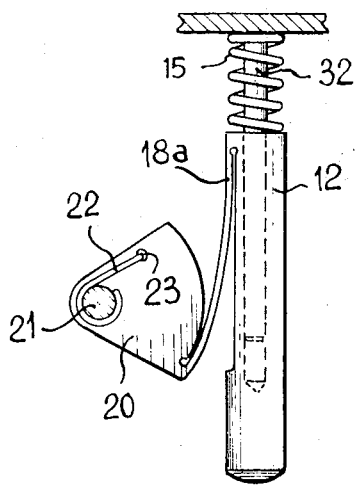
Figure 5:
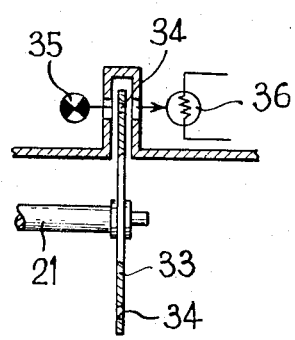
Figure 6:
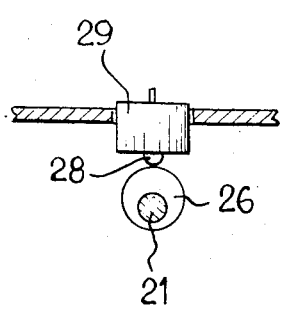
Figure 7:
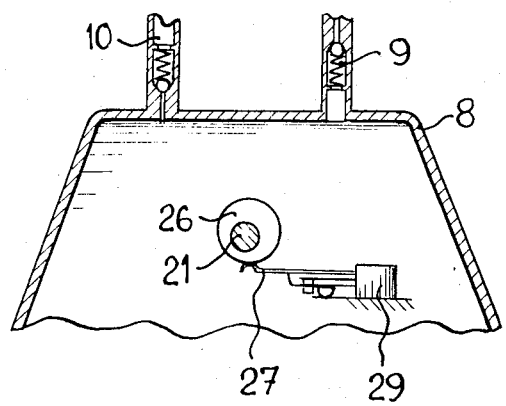

In order that the invention may be more clearly understood, reference will now be made to the accompanying drawings which show some embodiments thereof, purely by way of illustrative and non-limiting example, and in which:

FIG. 1 is a schematic, sectional view of a device according to the invention applied to a diaphragm pump, FIG. 2 is a partial schematic view showing how the sector and the rotatable shaft are coupled, FIG. 3 is a partial schematic view showing a modification of the embodiment of the coupling between the rod and the sector, FIG. 4 is a partial schematic view showing the rod, the sector and a strip made as a single piece, FIG. 5 is a partial schematic view showing a possible embodiment of an electrical pulse-generator, FIG. 6 is also a partial schematic view showing another possible embodiment of the pulse-generator, and FIG. 7 is a schematic view showing the pulse-generator located right inside the fluid.

Referring now to the drawings, there is shown therein a diaphragm type gasolene fuel pump of known type comprising a lower housing 1 having a fixing flange 2 and a second flange 3 to receive an upper housing 8.

On the flange 3 is located a diaphragm 4 which is held by its periphery by means of the upper housing 8 and which is connected by washers 5 to a central rod 6 which is set in reciprocating motion by any known mechanism and which is returned by a spring 7.

In accordance with the teaching of the invention, the normal upper housing of the pump is replaced by the housing 8 which includes, like a conventional housing which it replaces, a gasolene inlet 9 and a gasolene outlet 10, these two outlets being fitted with a valve allowing gasolene to flow in one direction only.

In its upper part and on its axis the housing 8 has a seating 11 which receives a rod 12 guided by a constriction 13 and by a washer 14 which, in addition, is acted on by a spring 15 bearing against the upper inside face of the seating 11 and thus impelling the rod 12 towards the centre of the washers 5 and 6 such that the rod 12 is always in contact with these washers and follows the pulsatory movement of the diaphragm 4.

At two separated points 16 and 17 the rod 12 receives two intersecting strips 18 and 19 which are fixed at the other end to a sector 20 while pressing against a substantial proportion of the arcuate portion i.e. periphery, of this sector 20.

The sector 20 is mounted to pivot about a shaft 21 with a minimum of play but in a completely free fashion. A spring 22 has a cranked end which is engaged in a hole 23 while it is also coiled for several turns around the shaft 21.

On the other side of the plane of the sector 20 is a second spring 24 which is also coiled around the shaft 21 but symmetrically to the spring 22, that is to say in the opposite direction, having one of its ends immobilised by a fixed part 25 of the device, specifically of the housing 8.

The operation of the mechanism which has just been described is as follows:

Since the diaphragm pump is of a known type, it is not necessary to describe its operation and it is known that the diaphragm 4 makes reciprocating pulsatory movements such that, since the rod 12 is pressed against this diaphragm by means of the spring 15, the same motion is transmitted to the rod 12 which, through the strips 18 and 19, drives the sector 20, causing it to pivot around the shaft 21 in either direction alternately.

The direction of coiling of the turns of the springs 22 and 24 is selected such that it locks or releases the shaft 21, depending on the direction of movement of the sector 20. In effect, when the sector 20 is impelled upwards due to the fact that the diaphragm pushes the rod 12 away in opposition to the spring 15, the sector 20 also pivots upwards and raises the end of the spring 22 which tends to tighten around the shaft 21 so that the latter is driven in rotation in the same direction.

During this movement, the shaft 21 tends to untighten the spring 24, so that it is free to move.

In the opposite direction, on the other hand, the sector 20 tends to unroll the spring 22 which is then unable to drive the shaft 21 positively in rotation, the shaft being, anyhow, immobilised by reason of the fact that the spring 24 then tends to tighten around the shaft 21 to lock it.

Due to these arrangements, there is thus obtained, on the basis of a reciprocating motion of the rod 12, a step by step rotation of the shaft 21 which is always in the same direction.

FIG. 1 shows an embodiment in which the shaft 21 receives a cam 26 on the profile of which is provided an elastic blade 27 capable of acting on the member 28 of a switch 29.

In this way, each time the cam 26 acts on the blade 27, the switch 29 creates an electrical pulse in a circuit 30 connected to a read-out or measuring device of any known or desired form and not shown in the drawing.

It will be readily understood that it is merely necessary to calculate the dimensions of the various components correctly to know precisely the relationship that exists between the number of revolutions of the shaft 21 (i.e. the number of pulsations of the diaphragm 4) and the amount of gasolene being fed, so that a read-out device indicating not a number of revolutions but, for example, the number of gallons or litres consumed may easily be used. The device which has just been described is particularly suitable for application to calculating the average consumption of a vehicle by connecting the circuit 30 to an average-speed indicator such as that I have described in my French Patent No. 69.19.346 filed June 11, 1969.

In this case, not only a device for the measurement of consumption at any given moment but also for measuring the average consumption per 100 kilometers from a given point is made available.

FIG. 3 shows a modification in which the rod 12 and the sector 20 are connected only by a single strip 18a which entails the use of a return spring 31. In this case, the strip 18a causes the sector 20 to pivot upwards when the rod rises, while the spring 31 returns the sector 20 downwards when the rod 12 falls.

In FIG. 4, is shown a modification in which the rod 12, the rod 18a and the sector 20 are made in one single piece, of synthetic injection-moulded plastics material for example.

In this case, the rod 12 is hollow and receives an inner rod 32 which serves to guide it.

Referring now to FIG. 5, it is seen that the shaft 21 receives a disc 33 including, in the vicinity of its periphery, fenestration shown as apertures 34 which, in the course of the rotation of the shaft 21, either do or do not interrupt a light beam emitted by a source 35 and received by a photo-electric cell 36. The fenestrations may be in the form of notches if desired.

With these arrangements, the rotation of the disc 33 causes a rythmic interruption of the light beam in such a way that the photo-electric cell 36 transmits pulses to the circuit 30 each time an aperture 34 in the disc 33 allows the light beam to pass.

These pulses are made use of in the same way as has been detailed above.

In FIG. 6 is shown a modification merely demonstrating that the cam 26 which is keyed to the shaft 21 may act directly on the operating member 28 of the switch 29 without it being necessary to use an intermediary blade 27 as is shown in FIG. 1.

FIG. 7 shows how the assembly of components which forms the device may be entirely submerged in the gasolene even if a micro-switch 29 is used which is liable to produce sparks between its contacts, since, in the absence of air to support combustion, the gasolene is not explosive.

The only precaution to be taken in this case is that the micro-switch 29 should always be completely within the gasolene whatever the level prevailing inside the housing.

The invention is not limited merely to the embodiments described and shown but, on the contrary, embraces all modifications as defined by the appended claims.

I claim:

1. A device for measuring the consumption of a fluid, comprising
   a housing through which the fluid flows;
   a reciprocable pumping member within said housing;
   a rotatable shaft supported within said housing;
   a linearly movable rod within said housing spring-biased against said pumping member and adapted to reciprocate with said member;
   a pivotable linking member having an arcuate surface;

a uni-directional driving mechanism coupling said linking member to said shaft for rotatably stepping said shaft in one direction;

an elongated flexible connecting strip connected at one end to said linking member and connected at its other end to said rod, said strip engaging said arcuate surface as said linking member pivots in one direction;

means responsive to the stepwise rotation of said shaft for generating electrical signals representing the amount of fuel flowing through said housing.

2. A fluid consumption measuring device according to claim 1, wherein said uni-directional driving mechanism comprises first and second springs coiled loosely around said rotatable shaft in opposite directions, an end of one spring being secured to said housing, an end of the other spring being connected to said linking member.

3. A fluid consumption measuring device according to claim 1, including a second elongated flexible connecting strip, said second strip connected at one end to said linking member and connected at its other end to said rod, the points of connection of said second strip being displaced from the points of connection of said first strip whereby said connecting strips pull said linking member in opposite directions in response to reciprocation of said rod.

4. A fluid consumption measuring device according to claim 1, further including a return spring connected to said linking member for urging said linking member in a direction opposite the direction in which said linking member is pulled by said elongated strip.

5. A fluid consumption measuring device according to claim 1, wherein said rod, elongated strip, and linking member are made from a single unitary piece of material, the elasticity of such material providing a force tending to return the linking member to its initial position after it has been displaced by movement of said rod.

6. A fluid consumption measuring device according to claim 5, wherein said rod is hollow and further including a second elongated rod extending into said hollow rod for guiding the movement thereof.

7. A fluid consumption measuring device according to claim 1, wherein said electrical signal generating means is disposed within said fluid.

* * * * *